United States Patent [19]
Rabe

[11] Patent Number: 5,963,640
[45] Date of Patent: *Oct. 5, 1999

[54] RADIOTELEPHONE HAVING AN ACOUSTICAL WAVE GUIDE COUPLED TO A SPEAKER

[75] Inventor: Karl W. Rabe, Chapel Hill, N.C.

[73] Assignee: Ericsson, Inc., Research Triangle Park, N.C.

[*] Notice: This patent is subject to a terminal disclaimer.

[21] Appl. No.: 08/746,246

[22] Filed: Nov. 7, 1996

[51] Int. Cl.⁶ .................................................. H04M 1/00
[52] U.S. Cl. ................................................. 379/433
[58] Field of Search ................................. 379/433, 434, 379/428; 455/90, 575

[56] References Cited

U.S. PATENT DOCUMENTS

| | | |
|---|---|---|
| 1,818,654 | 8/1931 | Steuart . |
| 3,249,873 | 5/1966 | Whittmore, Jr. . |
| 3,748,583 | 7/1973 | Andersen et al. . |
| 4,171,734 | 10/1979 | Peveto et al. . |
| 4,418,787 | 12/1983 | Eggert et al. . |
| 4,926,961 | 5/1990 | Gattey et al. . |
| 5,384,844 | 1/1995 | Rydbeck . |
| 5,692,046 | 11/1997 | Jambhekar ............................ 379/433 |
| 5,832,079 | 11/1998 | Rabe ..................................... 379/433 |

FOREIGN PATENT DOCUMENTS

| | | |
|---|---|---|
| 0 275 996 | of 1988 | European Pat. Off. . |
| 0 275 996 A2 | 1/1988 | European Pat. Off. . |
| 0 275 996 A3 | 1/1988 | European Pat. Off. . |
| 0 496 235 A2 | 1/1992 | European Pat. Off. . |
| 0 496 235 A3 | 1/1992 | European Pat. Off. . |
| 37 25 326 A1 | 7/1987 | Germany . |

OTHER PUBLICATIONS

Patent Abstracts of Japan, vol. 095, No. 006, Jul. 31, 1995.
Hanna, R.C. et al, "The Function and Design of Horns for Loudspeakers", Trans. AIEE, vol. 44 (Feb. 1924): 393–404.

*Primary Examiner*—Jack Chiang
*Attorney, Agent, or Firm*—Coats & Bennett, PLLC

[57] ABSTRACT

A radiotelephone having a wave guide for channeling sound energy from a speaker to the ear of a person utilizing the radiotelephone. The wave guide is disposed adjacent the speaker and acts to direct sound energy from the speaker to the vicinity of a person's ear. The wave guide comprises an elongated wall structure having inlet and outlet end portions and a varying cross-sectional area that varies in a uniform and repeating manner between maximum and minimum values. This elongated wave guide with its varying cross-sectional areas forms an acoustical low-pass filter that efficiently transmits and propagates low frequencies, that is frequencies in the range of 300 Hz to 3,000 Hz.

24 Claims, 5 Drawing Sheets

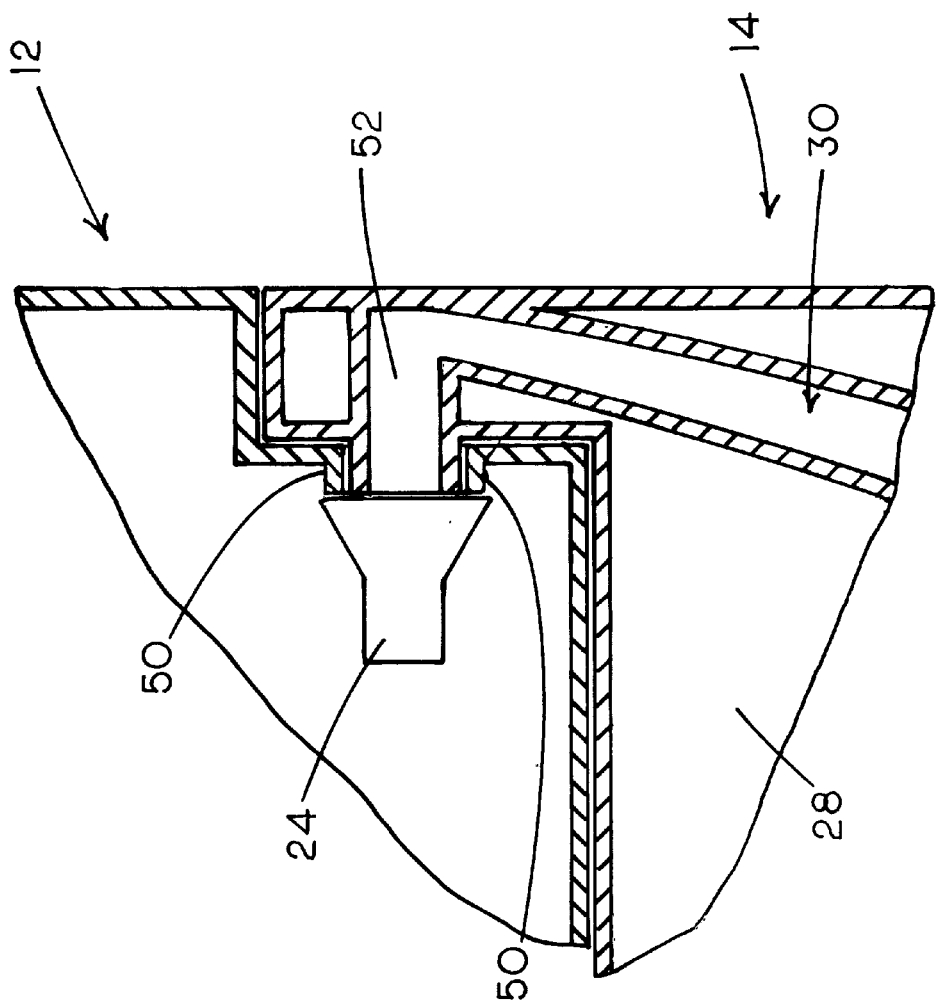

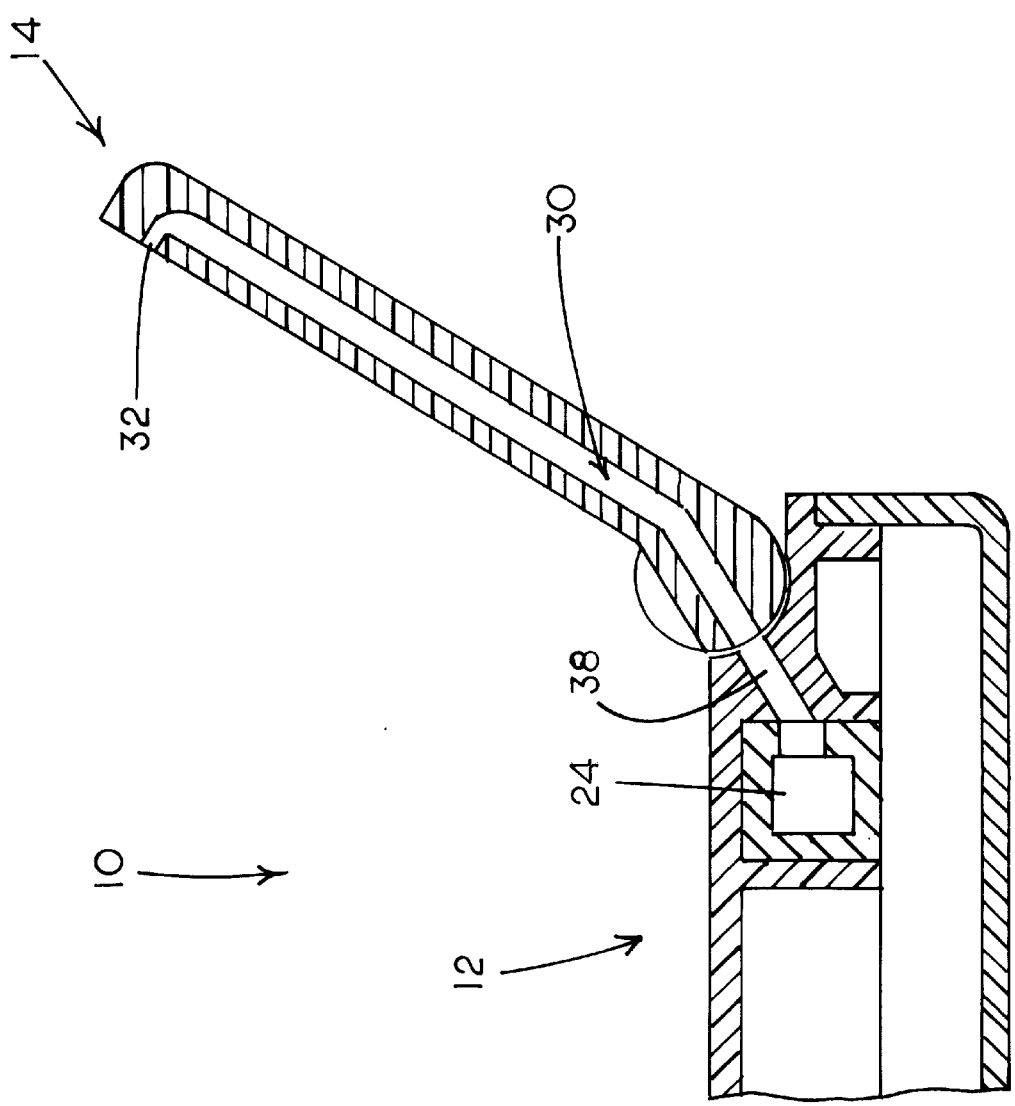

RADIOTELEPHONE HAVING AN ACOUSTICAL WAVE GUIDE COUPLED TO A SPEAKER

REFERENCE TO RELATED APPLICATION

The present invention relates to a concurrently filed, copending application entitled RADIOTELEPHONE HAVING A NON-RESONANT WAVE GUIDE ACOUSTICALLY COUPLED TO A MICROPHONE.

FIELD OF THE INVENTION

The present invention relates to radiotelephones and more particularly to a radiotelephone of the type having a main body and a flip wherein the flip includes an acoustical wave guide that is communicatively coupled to a speaker disposed in the radiotelephone.

BACKGROUND OF THE INVENTION

Radiotelephones typically include a main body having a speaker housed in the upper portion thereof and oriented to direct sound directly through an outer housing into the user's ear. The overall quality of speech and sound emitted by the speaker of a radiotelephone is sometimes referred to as speech intelligibility. Speech intelligibility in radiotelephones is generally affected by a number of design factors including the speaker design, how the speaker is housed, and how the emitted sound energy is channeled to the ear. Ideally, a radiotelephone should produce a fairly level frequency response for a frequency range of approximately 300 Hz to 3,000 Hz. In practice and with an unsealed ear, some radiotelephone designs experience a frequency response drop-off of about 12 db per octave starting at about 1,000 Hz and continuing towards the lower end of the frequency response scale. Thus, speech and sound associated with these lower frequencies is not transmitted clearly and distinctly. Consequently, the intelligibility of the transmitted speech and sound is often poor.

Moreover, almost universally, speakers are placed in the same relative positions in radiotelephones, that is near the top of the main body and situated to direct sound through the front of the housing. This enables users to create a sealed or near sealed relationship between the speaker and the ear. However, by consistently adhering to the thinking that the speaker can only be appropriately positioned in one location within the radiotelephone, overall design flexibility is certainly restricted.

SUMMARY AND OBJECTS OF THE INVENTION

The present invention entails a wave guide that Ls acoustically coupled to the speaker of the radiotelephone. Sound emitted from the speaker is directed through the wave guide to the user's ear. The wave guide is particularly designed to act as an acoustical low-pass filter. That is, the shape and configuration of the wave guide functions to pass low frequencies, that is those frequencies falling in the range of 300 Hz to 3,000 Hz. Moreover, by utilizing a wave guide in combination with the speaker, one finds that there is more design flexibility relative to the actual positioning of the speaker within the overall structure of the radiotelephone. By utilizing the wave guide to channel sound energy to the user's ear, frequencies falling in the range of 300 Hz to the exact position of the speaker is not as important as it was in conventional radiotelephone designs.

In one embodiment of the present invention, a radiotelephone is provided with a speaker and disposed adjacent the speaker is a wave guide for directing sound energy from the speaker into the ear of the person using the radiotelephone. The wave guide comprises an elongated sound channel having inlet and outlet portions with the inlet portion being disposed adjacent the speaker such that the sound output of the speaker is directed into the wave guide. To give rise to an acoustical low-pass filter, the wave guide is formed with a varying cross-sectional area. This varying cross-sectional area varies between maximum and minimum values in a repeating pattern between the inlet and outlet portions of the wave guide.

Also, the present invention entails a radiotelephone having a flip that houses the acoustical wave guide. In this embodiment of the present invention, the flip is movably mounted to a main body portion of the radiotelephone and includes the acoustical wave guide therein. Sound energy emitted from the speaker is directed into and through the wave guide, which is housed within the flip, and into the ear of the user.

It is therefore an object of the present invention to provide a radiotelephone with a wave guide for directing and channeling sound energy from a speaker wherein the wave guide acts as an acoustical low-pass filter.

Another object of the present invention is to provide a radiotelephone with a wave guide for channeling sound energy from a speaker that yields clear, undistorted and distinct speech.

Other objects and advantages of the present invention will become apparent and obvious from a study of the following description and the accompanying drawings which are merely illustrative of such invention.

BRIEF DESCRIPTION OF THE DRAWINGS

FIG. 6 is a fragmentary sectional view that illustrates a hinge-type acoustical coupler for the radiotelephone shown in FIG. 2.

FIG. 7 is a fragmentary sectional view that illustrates acoustically coupling the wave guide housed within the flip of FIG. 1 to a speaker mounted within the main body of the radiotelephone.

DETAILED DESCRIPTION OF THE INVENTION

Figure 1:
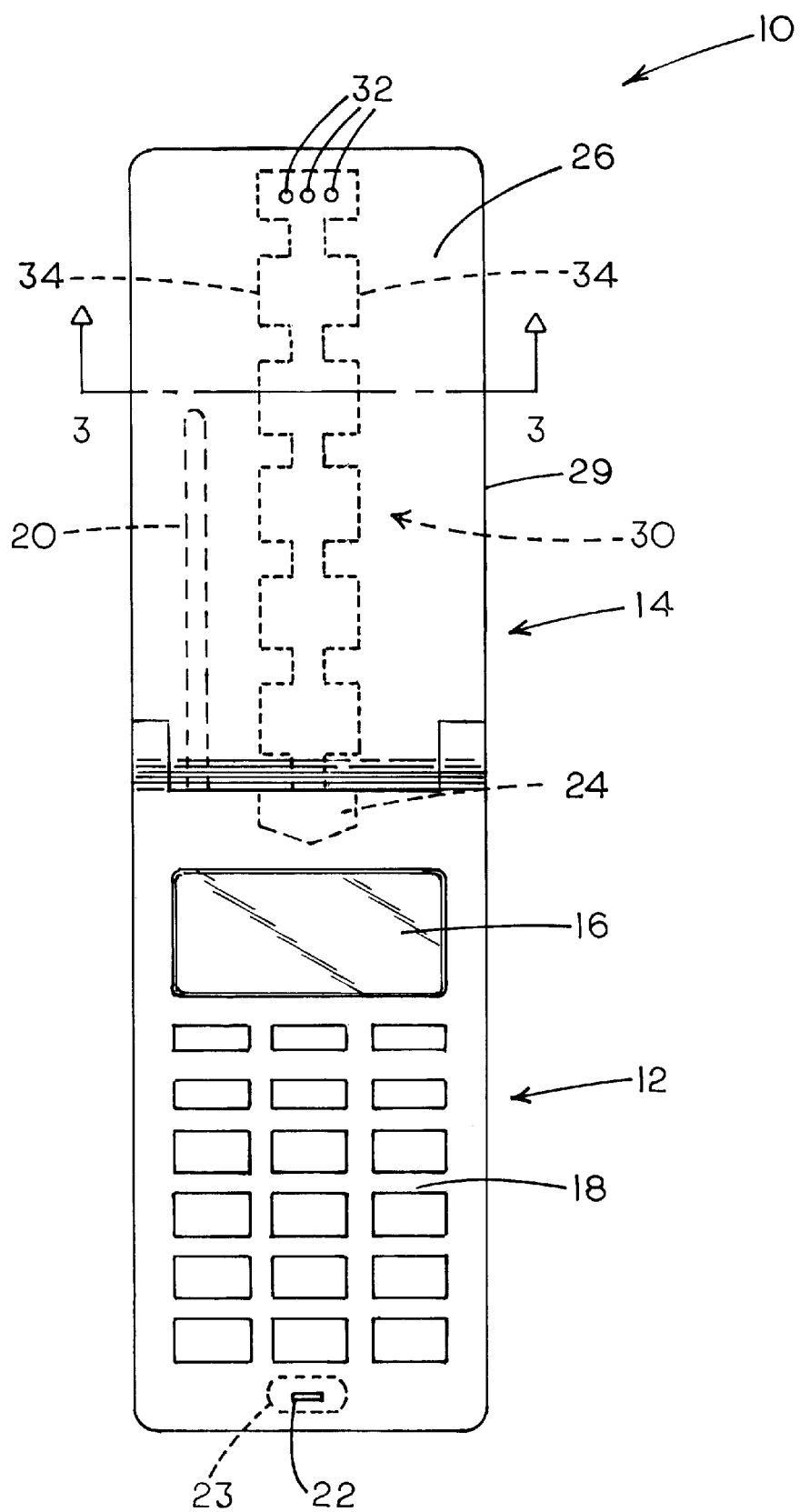
FIG. 1 is an elevational view of a radiotelephone having the acoustical wave guide of the present invention incorporated into a flip.

With further reference to the drawings, the radiotelephone of the present invention is shown therein and indicated generally by the numeral 10. Radiotelephone 10 is a conventional cellular telephone having a main body indicated generally by the numeral 12 and a pivotable flip indicated generally by the numeral 14. Flip 14 is designed to be moved between two extreme positions. In one position the flip 14 serves the purpose of providing a cover for the front portion of the main body 12. In a second operative position the flip 14 is open with respect to the main body 12 and is designed to be placed in the vicinity of a user, s ear. As will be appreciated from subsequent portions of this disclosure, sound energy emitted from a speaker associated with the radiotelephone 10 is actually transmitted through the flip 14 to the user's ear.

Viewing main body 12 in more detail, it is seen that the same includes a display 16 and an adjacent-keyboard 18 formed about a front panel or face of the radiotelephone 10-In the case of the embodiment illustrated herein, a mike 23 is disposed within a lower portion of the main body and is open to an area outside the main body 12 via a mike opening 22. Also formed in the main body 12 of the radiotelephone 10 is a conventional speaker 24. Finally, extending upwardly from the main body 12 is an antenna 20.

Figure 3:
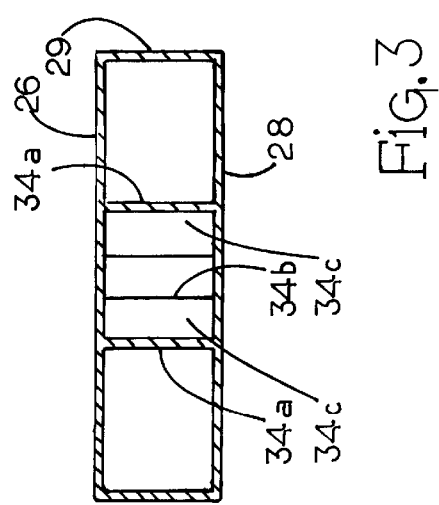
FIG. 3 is a cross-sectional view taken along the lines 3—3 of FIG. 1.

Turning to the flip 14, and particularly FIGS. 1 and 3, it is seen that the same includes a pair of opposed sides 26 and 28 and a surrounding edge 29. Defined between the sides 26 and 28 and the edge 29 is an open cavity or hollow area. As pointed out above, flip 14 is pivotally attached to an upper portion of the main body 12. Details of this pivotal connection are not dealt with herein in detail because such is not per se material to the present invention and because basic pivot connectors for attaching flip panels to radiotelephones is well-known and appreciated by those skilled in the art. Also, details of the radiotelephone 10 are not dealt with herein because they too are not per se material to the present invention and are well-known and appreciated by those skilled in the art. More particularly, one is referred to a full line of radiotelephones manufactured by Ericsson Inc., of Research Triangle Park, North Carolina.

The present invention deals with channeling sound energy or speech from the speaker 24 through the body of the flip 14 to the ear of a user. To achieve this a wave guide, indicated generally by the numeral 30 is incorporated into the structure of the flip 14. Wave guide 30 as seen in FIGS. 1–4, comprises an elongated structure that includes a varying cross-sectional area along a reference axis 40 (see FIGS. 3 and 4). Wave guide 30 includes an inlet portion which receives the sound energy emitted from the speaker 24 and an outlet portion which directs the sound energy from the wave guide into an adjacent ear of a user.

The inlet portion of the wave guide 30 is disposed adjacent the output side of the speaker 24 or is coupled to the speaker by a transition tube or pipe. In any event, it is preferred that there be an airtight seal surrounding the connection of the speaker to the inlet portion of the wave guide. In fact, it is preferable that the entire wave guide and its connection with the speaker be airtight.

Formed in the outlet portion of the wave guide 30 is a series of sound ports 32. Sound ports 32 direct the sound energy being propagated through the wave guide out the wave guide into the ear of a user.

Viewing the wave guide 30 in more detail, it is seen that the same includes a pair of opposed side walls 34 (FIGS. 1 and 2) that in the case of the embodiment illustrated herein are sandwiched between the opposed sides 26 and 28 of the flip 14. In fact, in the embodiment illustrated, one side 26 of the flip actually forms the top of the wave guide while the other side of the flip, side 28, forms the bottom of the wave guide. The inlet end of the wave guide is open to the output of the speaker 24 while the outlet end of the wave guide is closed except for the provision of the sound ports 32.

Figure 5:
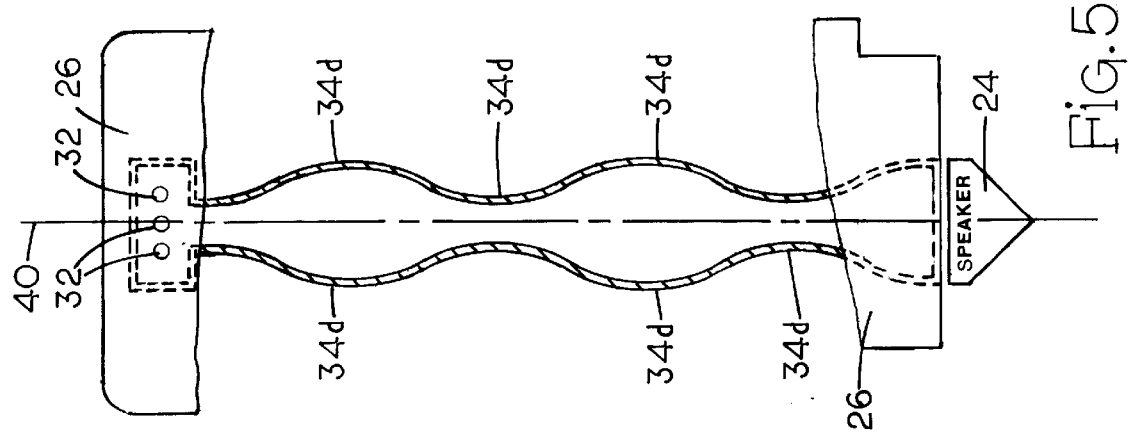
FIG. 5 is a top plan view of a second design for the wave guide of the present invention with the top thereof being broken away to better illustrate the structure of the wave guide.
Figure 4:
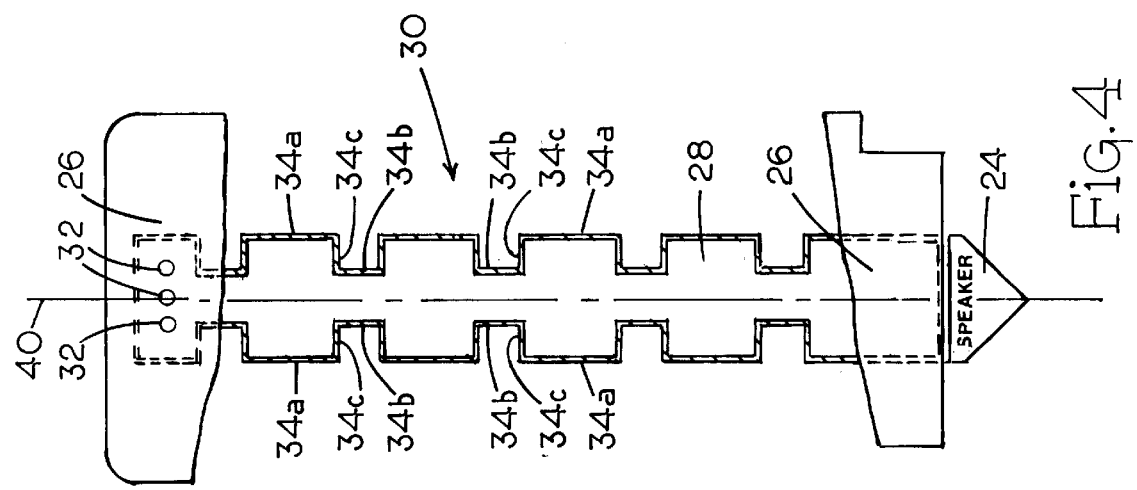
FIG. 4 is a top plan view of one design for the wave guide of the present invention with the top thereof being broken away to better illustrate the structure of the wave guide.

As noted above, the wave guide 30 is designed such that it is elongated and includes a cross-sectional area that varies along the reference axis 40. As illustrated in FIGS. 4 and 5, the cross-sectional area varies back and forth between maximum and minimum values. In the two embodiments illustrated in FIGS. 4 and 5, the varying cross-sectional areas are generally uniform and repeatable. In the case of the wave guide embodiment shown in FIG. 4, it is seen that the opposed sides 34 conform to a rectangular (meaning square or rectangular) wave configuration. Note that each side or side wall is made up of an outer wall segment 34a, an inner wall segment 34b and a connector segment 34c. The distance between corresponding inner wall segments 34b establish the minimum cross-sectional area of the wave guide 30. Likewise, the distance between outer wall segments 34a establish the maximum cross-sectional area of the wave guide 30.

Viewing FIG. 4, it is appreciated that as sound energy travels from the speaker 24 down the wave guide 30 towards the outlet end, that the sound energy is constrained to repeatedly move through both the larger and smaller cross-sectional areas of the wave guide 30. Thus, because of the repeating pattern of the wall structure of the wave guide 30 shown in FIG. 4, the sound energy passing therethrough is periodically subjected to the restrictions of the smaller cross-sectional areas. After passing through each restriction, the sound energy expands into a succeeding area bound by the outer wall segments 34a.

Now, turning to FIG. 5, a second design for the wave guide 30 is illustrated therein. The second design for the wave guide also comprises an elongated, variable cross-sectional area sound tube. Instead of the rectangular wave configuration that form the opposite sides of the embodiment of FIG. 4, the embodiment of FIG. 5 utilizes a side wall structure that comprises a series of repeatable and connected concave-convex segments 34d. Exteriorly of the wave guide 30, the sides 34 assume a series of concave and convex, shapes. That is, the sides form continuous segments that are both concave and convex shaped. As with the embodiment illustrated in FIG. 4, sound energy passing from speaker 24 through the elongated sound tube or wave guide 30 experiences repeated restriction and expansion from the inlet end portion to the outlet end portion.

The design of the wave guides 30 shown in FIGS. 4 and 5 basically yield what can appropriately be referred to as an acoustical low-pass filter. That is, the shape and design of these wave guides serve to allow low frequencies, that is frequencies from approximately 250 Hz to 1,000 Hz, to efficiently pass through the sound channel or tube. That is, the frequency response of the sound or speech directed from the outlet portion of the wave guide is generally flat for the frequency range of 300 Hz to 3,000 Hz. Consequently, the speech is clear, distinct and intelligible.

The size and dimensions of the wave guide 30 can vary. It is contemplated that the length of the wave guide can vary from approximately ¾ inch to 4 inches in length. It is contemplated that the minimum distance between the opposed side walls 34 will, in and a preferred design. be in the range of approximately 1 to 2 millimeters. The widest distance between the side walls 34 is contemplated to be approximately 5 to 10 millimeters. Again, these distances and parameters can vary depending on circumstances and conditions.

In the two embodiments illustrated herein, the top and bottom sides of the wave guide 30 is flat and is actually formed by the opposed walls 26 and 28 of the flip 14. However, it should be appreciated that the top and bottom as well as all of the surrounding side wall structure of the wave guide 30 could be uniformly shaped.

Figure 2:
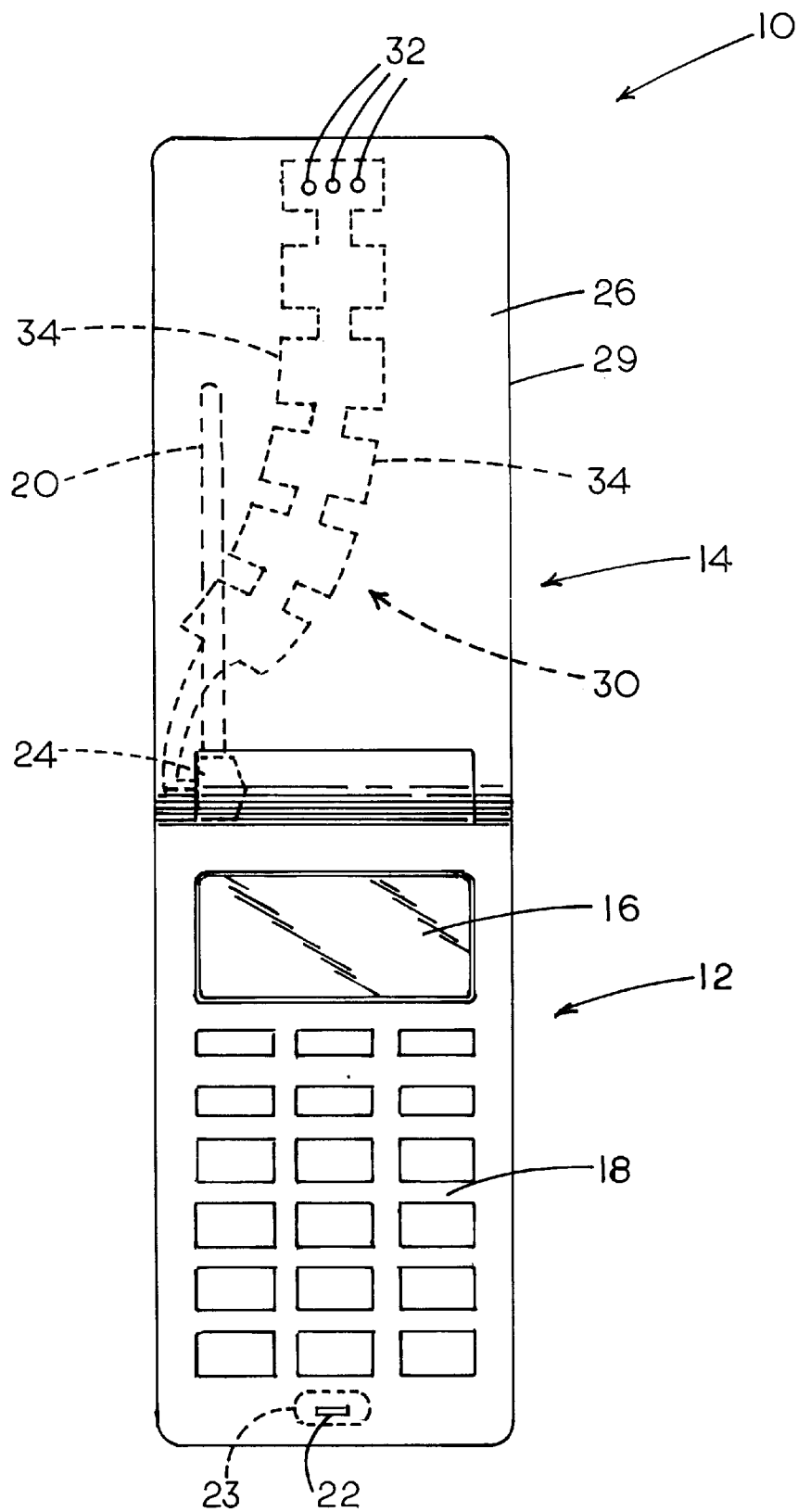
FIG. 2 is a view similar to FIG. 1 but shows a curved wave guide pivotally coupled to a speaker of the radiotelephone.

Moreover, the wave guide 30 can be incorporated into the flip 14 in any number of configurations. En FIG. 1, the wave guide 30 assumes a straight configuration and is generally aligned with speaker 24 disposed in the main body 12. In the embodiment of FIG. 2, the wave guide 30 is slightly curved in order that it can be coupled to speaker 24 through one of the flip hinge assemblies. Because the flip 14 is movable relative to the speaker 24, it is appreciated that the radiotelephone 10 must be provided with an acoustical coupler compatible with the movable flip 14 and yet provide a generally airtight seal around the speaker and the inlet portion of the acoustical wave guide 30. By utilizing a conventional detent mechanism, the flip 14 utilized in FIG. 1 can be pivoted into an operative position where the inlet be pivoted into an operative position where the inlet portion of the wave guide 30 is aligned with the output of the speaker 24. This is particularly illustrated in FIG. 7 which shows the flip 14 in an open and operative position. Note in this position where the wave guide 30 effectively extends through the joint formed between the main body 12 and the flip 14. While various different designs can be employed, the design of FIG. 7 relies on the structural relationship between the main body 12 and the flip 14 to form a relatively airtight seal when the flip 14 is rotated to the operative position shown in FIG. 7. In the embodiment of FIG. 2, the hinge assembly interposed between the speaker 24 and the inlet end of the wave guide can be provided with a coaxial throughway through which the output of the speaker can be channeled into the inlet portion of the wave guide 30. In the way of an example, FIG. 6 illustrates a design where the hinge assembly that couples the flip 14 of the main body 12 also serves the function of channeling sound energy from the speaker 24 to the inlet of the wave guide 30. Formed adjacent speaker 24 and the main body 12 is a wall structure that forms an insert opening. Specifically, as shown in FIG. 6, the wall structure that forms the insert opening comprises an L-shaped wall 50. The inlet of the wave guide 30 merges with a hollow pivot tube 52 that is pressed into the insert opening formed by the L-shaped wall 50. A generally airtight seal is formed between the pivot tube 52 and the insert opening but yet the pivot tube 52 can freely rotate within the insert opening. It should be understood that the acoustical coupling structure shown in FIG. 6 is an example of one design and that there are other coupling mechanisms and designs that could be utilized to acoustically couple the wave guide 30 to the speaker 24.

It should be appreciated, that the wave guide 30 itself could simply be pivoted or attached to the main body of the radiotelephone 10 without the need of the same being incorporated into a conventional flip type structure.

The present invention may, of course, be carried out in other specific ways than those herein set forth without parting from the spirit and essential characteristics of the invention. The present embodiments are, therefore, to be considered in all respects as illustrative and not restrictive, and ail changes coming within the meaning and equivalency range of the appended claims are intended to be embraced therein.

What is claimed is:

1. A radiotelephone having a wave guide for channeling sound energy from a speaker to an ear of a person using the radiotelephone, comprising: a radiotelephone having a speaker; a wave guide disposed adjacent the speaker for directing sound energy from the speaker into the ear of the person using the radiotelephone; the wave guide including an elongated sound channel having inlet and outlet portions with the inlet portion being disposed adjacent the speaker such that the sound output of the speaker is directed into the wave guide and through the wave guide and out the outlet portion thereof into the ear of the person using the radiotelephone; and wherein the wave guide includes a varying cross-sectional area that repeatedly varies between maximum and minimum cross-sectional areas with at least one minimum cross-sectional area occurring intermediately between the inlet and outlet portions of the wave guide.

2. The radiotelephone of claim 1 wherein the cross-sectional area of the wave guide repeatedly varies between maximum and minimum values along a reference axis.

3. The radiotelephone of claim 1 wherein the wave guide includes a wall structure having a section that assumes a generally rectangular wave configuration.

4. The radiotelephone of claim 3 wherein the rectangular wave configuration is repeatable along a reference axis of the wave guide.

5. The radiotelephone of claim 4 wherein the wall structure of the wave guide includes a series of sides and wherein at least two sides include sections that conform to the rectangular wave configuration.

6. The radiotelephone of claim 1 wherein the wave guide includes a wall structure having a section that assumes a generally scalloped shape.

7. The radiotelephone of claim 1 wherein the wave guide includes a wall structure having repeating curved segments.

8. The radiotelephone of claim 7 wherein the wall structure of the wave guide includes at least one section that assumes a concave-convex shaped pattern.

9. The radiotelephone of claim 8 wherein the wall structure of the wave guide includes repeating concave-convex wall segments.

10. The radiotelephone of claim 1 including a main body and a flip movably mounted to the main body and having the wave guide disposed therein.

11. The radiotelephone of claim 10 wherein the flip includes opposed sides that form opposite sides of the wave guide.

12. The radiotelephone of claim 1 wherein the speaker is housed within the main body of the radiotelephone and wherein there to the rectangular wave is provided an acoustical pivot connector that interfaces the speaker with the inlet end portion of the wave guide.

13. The radiotelephone of claim 12 wherein the cross-sectional area of the wave guide repeatedly varies between maximum and minimum values along a reference axis.

14. A radiotelephone having a wave guide for channeling sound energy from a speaker to an ear of a person using the radiotelephone, comprising:
   a) a main body;
   b) a flip movably mounted to the main body;
   c) a speaker; and
   d) a wave guide disposed within the flip and acoustically coupled to the speaker for directing sound energy from the speaker into the ear of the person using the radiotelephone the wave guide having a reference axis and a varying cross-sectional area that repeatedly varies between maximum and minimum cross-sectional areas along a length of the wave guide.

15. The radiotelephone of claim 14 wherein the wave guide assumes an elongated configuration and includes a cross-sectional area that varies along a reference axis.

16. The radiotelephone of claim 15 wherein the speaker is housed within the main body of the radiotelephone and wherein there includes a cross-sectional is provided an acoustical pivot connector that forms between the flip and the speaker and which permits is provided an acoustical pivot connector that forms an interface between the flip and the speaker and which permits sound energy emitted by the speaker to be directed into the wave guide.

17. The radiotelephone of claim 15 wherein the wave guide includes a wall structure having inlet and outlet portions and wherein the wall structure is formed such that the cross-sectional area repeatedly varies between maximum and minimum values between the inlet and outlet portions.

18. The radiotelephone of claim 15 wherein at least a portion of the wall structure of the wave guide assumes a generally rectangular wave configuration.

19. The radiotelephone of claim 18 wherein opposite sides of the wall structure assumes a repeating rectangular wave configuration.

20. The radiotelephone of claim 19 wherein the flip includes a repeating rectangular wave opposite sides and wherein the opposite sides of the flip form opposite sides of the wave guide.

21. The radiotelephone of claim 15 wherein the wave guide includes a wall structure having repeating curved segments.

22. The radiotelephone of claim 21 wherein the wall structure of the wave guide includes at least one section that assumes a concave-convex shaped pattern.

23. The radiotelephone of claim 22 wherein opposite sides of the wall structure that forms the wave guide assume concave-convex shaped patterns.

24. The radiotelephone of claim 23 wherein the flip includes opposite sides and wherein those opposite sides form portions of the wall structure of the wave guide.

* * * * *